United States Patent [19]

Duda

[11] 4,195,877
[45] Apr. 1, 1980

[54] EXTERIOR ROOM FOR A TRAILER

[76] Inventor: Henry J. Duda, 3357 N. Newland Ave., Chicago, Ill. 60634

[21] Appl. No.: 933,281

[22] Filed: Aug. 14, 1978

[51] Int. Cl.$^2$ ............................................. B60P 3/34
[52] U.S. Cl. ................ 296/172; 135/5 AT; 52/2; 160/114
[58] Field of Search ............ 296/23 R; 52/2, 63; 135/1 A, 5 A, 5 AT; 160/114

[56] References Cited

U.S. PATENT DOCUMENTS

| | | | |
|---|---|---|---|
| 3,004,592 | 10/1961 | Norton | 160/114 |
| 3,324,869 | 6/1967 | Duda | 135/5 AT |
| 3,478,472 | 11/1969 | Kwake | 52/2 |
| 3,810,262 | 5/1974 | Strand | 52/2 |

*Primary Examiner*—Philip Goodman
*Attorney, Agent, or Firm*—Vogel, Dithmar, Stotland, Stratman & Levy

[57] ABSTRACT

An exterior room for a trailer in which front, rear and side panels cooperate with an external frame connected to the trailer body to provide an external screen room. The front and side panels are joined at the junctures thereof by zippers to provide entry and exit to the screen room. The front panel is maintained under tension by means of a cable between supports for the side panels. Each of the front, rear and side panels is provided with an envelope at the bottom thereof which contains a watertight container. Water in the watertight container provide ballast to prevent the panels from flapping in the wind.

8 Claims, 8 Drawing Figures

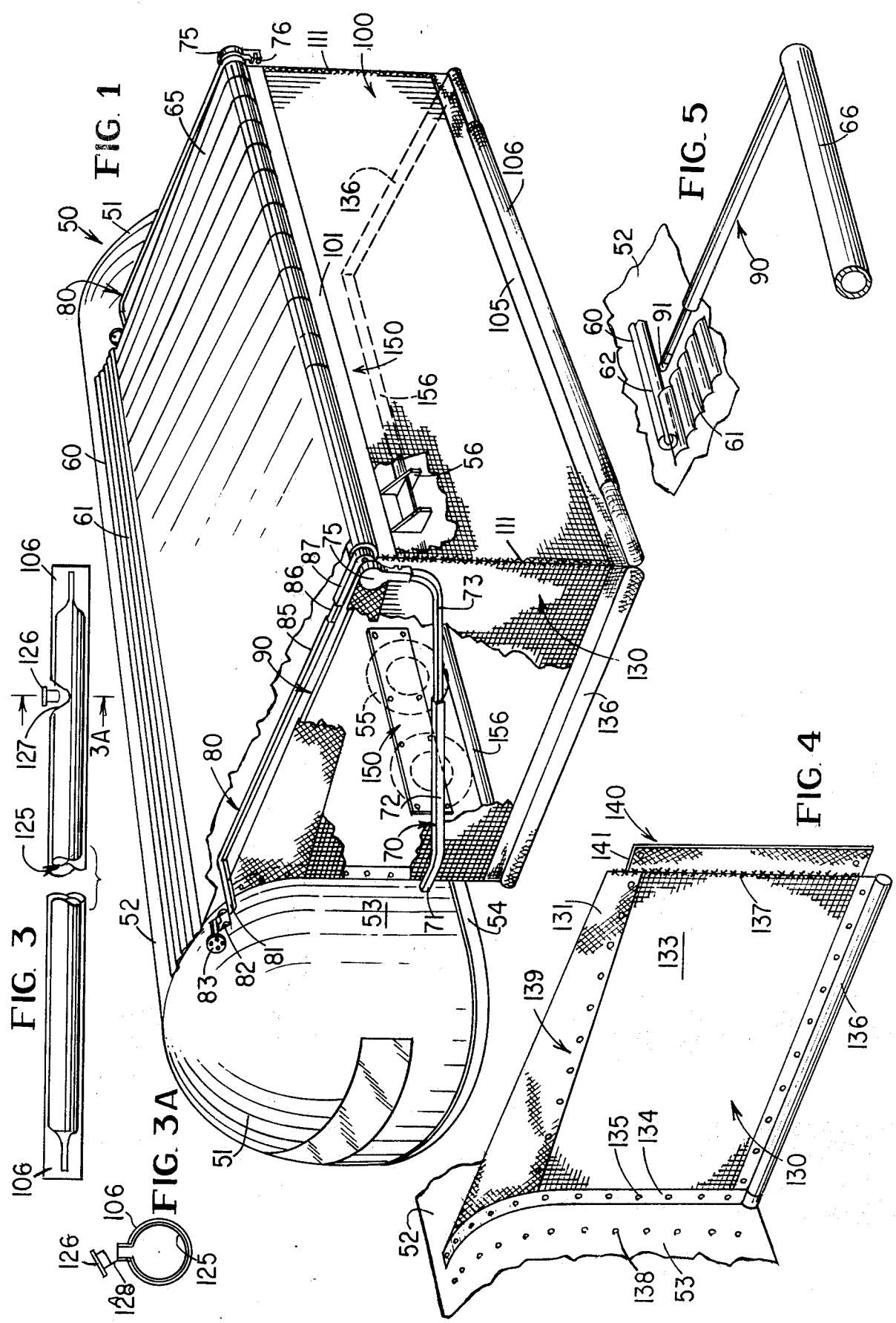

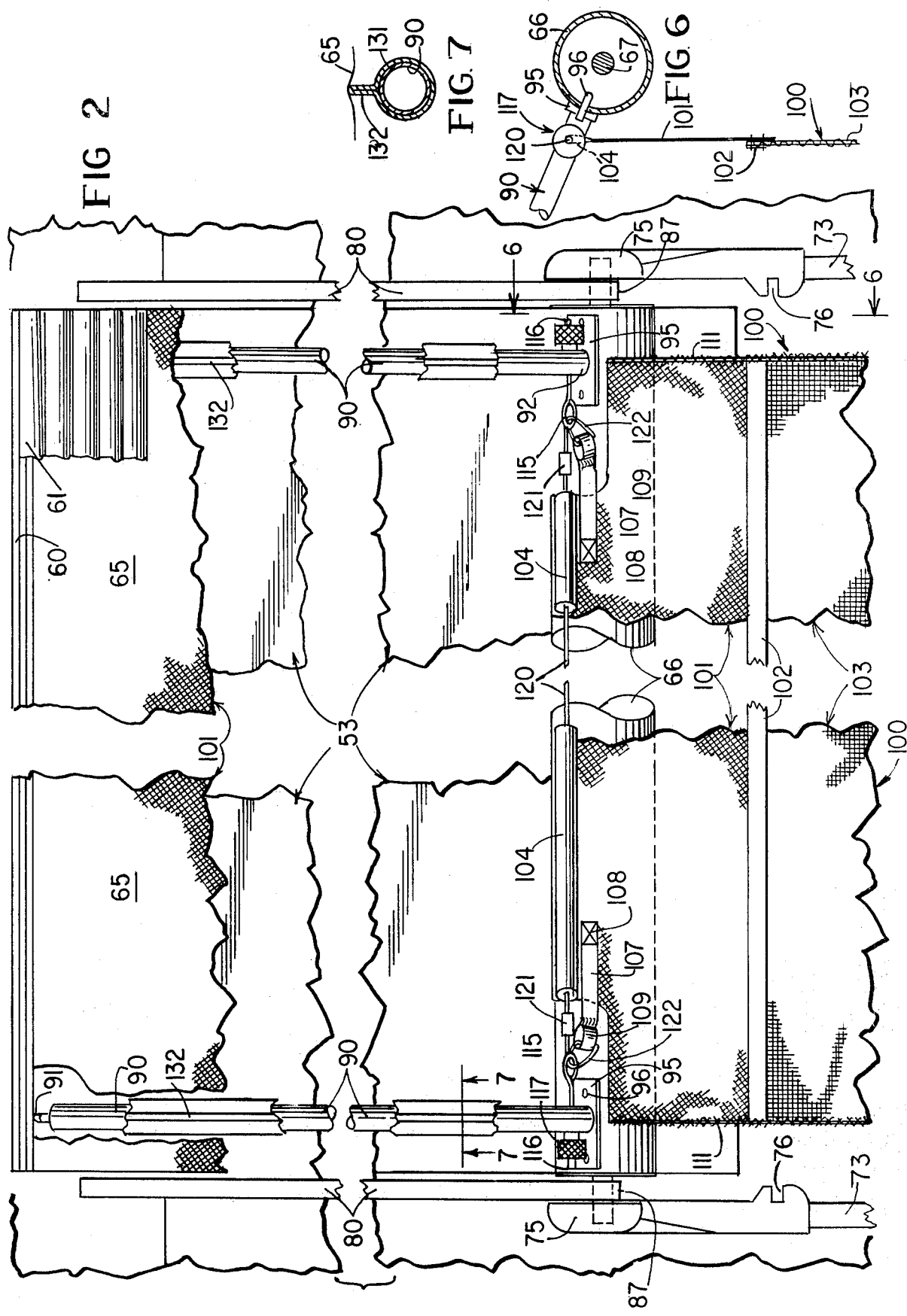

EXTERIOR ROOM FOR A TRAILER

BACKGROUND OF THE INVENTION

External screen rooms for trailers have long been desirable and several are currently available. One of the principal difficulties in screen rooms is the bottom edge of the panels comprising the room. If the panels are left loose they tend to flap in the wind making a disturbing noise and also admitting insects, mosquitoes and the like. Efforts to make these panels or portions of the room fast usually comprise providing grommets at the bottom thereof and associated tie-down or stake devices. These attempts have been unsatisfactory for many reasons, not the least of which is that many screen rooms are used with permanently installed trailers which are provided with a concrete pad.

The external screen room of the present invention is specifically designed to be used with the awning and frame members provided therefor disclosed in my prior U.S. Pat. No. 3,324,869 issued to Henry J. Duda on June 13, 1967, the disclosure of which is incorporated herein by reference. However, the concept of the present invention is certainly applicable to any external screen room and is not necessarily limited to the frame device illustrated in the above-captioned patent.

SUMMARY OF THE INVENTION

This invention relates to an outside room for a travel trailer, and more particularly to an outside room for a travel trailer provided with watertight containers at the bottom of each panel to provide ballast for the associated panel.

An important object of the present invention is to provide an outside screen room for a travel trailer in which each individual panel making up the screen room is provided with its individual ballast to provide a substantially insect proof room for use in conjunction with a travel trailer.

Another object of the present invention is to provide an outside room for a travel trailer comprising frame means constructed and arranged to be connected to one side of the travel trailer and to extend outwardly therefrom, the frame means having two members extending substantially perpendicularly to the longitudinal axis of the trailer interconnected by a member parallel to the longitudinal axis of the trailer, a roof covering the members and connected to the trailer, a front panel mounted on the parallel member having sufficient length to extend from the member to the ground, two side panels each respectively mounted on one of the perpendicular members and each having sufficient length to extend from the respective member to the ground, means connecting one edge of each side panel to the trailer and the edge parallel thereto to the adjacent edge of the front panel, and watertight containers connected to the side panel and to the front panel near the bottoms thereof.

Another object of the present invention is to provide an outside room for a travel trailer of the type set forth in which a rear panel provides a completely enclosed, insect free, outside room.

Still another object of the present invention is to provide an outside room for a travel trailer of the type set forth in which tensioning means is provided for the front and side panels to maintain the panels under tension.

These and other objects of the present invention may be more readily understood when taken in connection with the following specification and drawings, in which:

BRIEF DESCRIPTION OF THE DRAWINGS

FIG. 1 is a perspective view of a travel trailer having an outside room attached thereto embodying the features of the present invention;

FIG. 2 is a front elevational view of the outside screen room illustrated in FIG. 1 as seen from the inside of the screen room near the front panel looking upwardly toward the awning;

FIG. 3 is a front elevational view of a watertight container and bottom envelope of the front and two side panels of the present invention;

FIG. 3A is a sectional view of the watertight container and envelope therefor illustrated in FIG. 3 as viewed along lines 3A—3A thereof;

FIG. 4 is an enlarged perspective view of a side panel of the present invention showing the connection mechanism between the trailer body and the side panel and also the relationship between the screen panel and an opaque panel connected thereto;

FIG. 5 is an enlarged perspective view of the frame mechanism for the outside panel particularly illustrating the coaction between the awning roller and the spring-loaded side pieces;

FIG. 6 is a view of the mounting mechanism for the front panel illustrated in FIG. 2 as viewed along lines 6—6 thereof; and FIG. 7 is a sectional view of one of the side braces illustrated in FIG. 2 as seen along lines 7—7 thereof.

DESCRIPTION OF THE PREFERRED EMBODIMENT

Referring now to the drawings, there is disclosed a trailer 50 of the type having a dome ends 51, a top 52 and side walls 53. A panel 54 extends completely around the bottom of the trailer 50 interrupted by wheel wells wherein the wheels 55 reside. Foldaway stairs 56 are provided with vehicles of this type. An awning rail 60 is secured along one side of the side wall 53 of the trailer 50 in the usual fashion to which is connected an awning case 61, usually made of metal. An awning key 62 in the form of an elongated tube having a slot therein which connects to the awning rails 60 has an awning 65 connected thereto, all in the usual fashion as disclosed in my previously referenced and incorporated patent. At the far end of the awning, there is a roller 66 through which extends a pole 67.

Lower frame arms 70 are provided on each side of the awning 65 and are pivotally mounted as at 71 to the side 53 of the trailer 50 and extend outwardly therefrom perpendicular to the longitudinal axis of the trailer. The lower frame arms 70 have a tube 72 with an extension 73 therein and mechanism (not shown) for fixing the extension 73 at any desired length. At the distal end of the extension arm 73 is a head casing 75 having a retaining slot 76 therein, see FIGS. 1 and 2. One of the head casings 75 is provided with a motor in the form of a torsion spring suitable for automatically retracting the awning 65, all as is well known in the art. Upper frame arms 80 are also provided on each side of the awning 65 and include an end 81 pivotally mounted to a mounting plate 82 on the side wall 53 of the trailer 50 to which is also provided a catch 83 constructed and arranged to fit within the slot 76 in the heads 75 to maintain the awning 65 in the folded condition during travel. The upper frame arms 80 are each provided with a main tube 85 through which extends an extension arm 86 having means (not shown) to accommodate different lengths of awnings. The distal end 87 of the upper frame arms 80 have apertures therein so that the pole 67 extending through the roller 66 passes through the upper frame arms 80 and into the associated head casings 75.

Two spring-loaded braces or poles 90 are provided on each side of the awning 65 and generally are parallel to the upper frame arms 80. Each of the spring-loaded braces or poles 90 has a resilient tip 91 which fits against the side 53 of the trailer 50 and an opposite end 92 which fits into a mounting plate 95 fixedly connected by fasteners 96 to the roller 66. The spring-loaded poles 90 are constructed in several sections such that they may be easily disassembled and removed from the construction and stored inside the trailer when the external room is not in use. However, when the spring-loaded poles 90 are assembled and in use, spring mechanism inside each pole maintains an expanded tension fit between the sides 53 of the trailer 50 and the roller 66, to provide support for and tension to the side panels 130, as hereinafter described.

A front panel 100 extends from the roller 66 to the ground and is comprised of a fabric section 101 at the top thereof which may have a vertical extent of about 8". The fabric section 101 is connected to a tape 102 which in turn is connected to a screen 103. The fabric section 101 is formed into a pocket 104, whereas the screen 103 is connected by means of a tape (not shown) to a fabric section 105 at the bottom, which fabric section 105 is also formed into a pocket 106. The pocket 106 does not extend the entire longitudinal length of the front panel 100 as does the top pocket 104, this being for a reason to be explained. As seen in FIG. 2, the top fabric section 101 is provided with two elastic tabs 107, one tab being located near each end of the front panel and having one end 108 thereof fixedly connected to the fabric 101 by means of stitching, adhesive or the like, and having the other end 109 formed into a loop. The vertical edges of the front panel 100 are provided with half of a zipper 111 which extends from the top of the front panel all the way to the bottom thereof.

Eye bolts 115 have the threaded ends 116 thereof extending through the spring-loaded poles 90 near the end 92 thereof which is mounted to the plates 95. Knurled knobs 117 are engaged on the threaded ends 116 of the eye bolts 115 so as to provide adjustment by bearing against the associated pole 90. A cable 120 extends between the eye bolts 115 and passes through the upper pocket 104 of the front panel 100. The cable 120 is provided with attachment ends 121 for connection to the eye bolts 115. Metal attachment D-rings 122 interconnect the loops 109 of the tabs 107 with the eye bolts 115 to insure that the front panel 100 is stretched between the eye bolts and maintained in tension.

A water bag 125, see FIGS. 3 and 3A, is inserted into the bottom pocket 106. The water bag 125 is provided with a stopper 126 which is aligned with an opening 127 in the pocket 106 to provide easy access thereto. The watertight container or water bag 125 may be made of any water retentive material such as polyvinyl chloride or the like. The stopper 126 is connected to the water bag body by means of an integrally molded, one-piece hinge 128 which interconnects the stopper 126 and the body 125. This construction facilitates use of the water bag 125 by preventing loss of the stopper during the filling operation.

Two side panels 130 are provided for the external room. Each side panel 130 has an upper fabric pocket 131 through which fits the spring-loaded pole 90 and which has an upwardly extending fabric seal 132 which bears against the awning 65 to prevent insects and the like from entering the external room between the side panels 130 and the awning. Each of the side panels 130 has a major screen portion 133 thereof and connected thereto an end fabric flange 134 running the entire vertical extent of the side panel 130 adjacent the connection with the trailer 50. Fasteners 135 are provided intermittently along the fabric flange 134 and aligned with and connect to fasteners 138 provided on the side wall 53 of the trailer. A bottom fabric pocket 136 is provided for each of the side panels 130 and is of the same vertical dimension as the pocket 106 for the front panel 100. A zipper portion 137 is provided at the end edge of the side panel 130 away from the fabric strip 134 and cooperates with the zipper portion 111 of the front panel to provide closure at the junctures between the front panel 100 and the side panels 130. Fasteners 139 are provided intermittently along the top fabric portion 131 and the bottom fabric portion above the bottom pocket 136 to connect a modesty panel 140 on the inside of the side panel 130. The panel 140 is opaque and provides privacy when connected to the fasteners 139, the modesty panel 140 being provided with corresponding fasteners 141 which align with the individual fasteners 139 of the side panel 130.

A rear skirt 150 connects to the trailer 53 and extends downwardly to the ground and is also provided with a rear skirt bottom pocket 156 in which is inserted a watertight container (not shown) of the same type as previously discussed and illustrated.

In a constructional example, the front panel 100 includes a fabric skirt 101 approximately 8" wide and running the full horizontal length of the panel 100, the pocket 104 at the top thereof being approximately 1". The cable 120 is ⅛" stainless steel provided with stainless eye bolts 115. The D-ring 122 is connected by a 6" long elastic fabric strip 107 connected as previously discussed as at 108. The knobs 117 are ¾" and threaded onto 3" of the threaded portion 116 of the eye bolts 115. The screen portion 103 of the front panel 100 has a 64" vertical extent and at the bottom of the screen is a 22½" wide apron with a 7" pocket 106 thereon. The watertight container 125 is a polyvinyl chloride tube approximately 4" in diameter and approximately 4' shorter than the length of the front panel 100. This provides approximately 2' at each end of the front panel 100 for use as exit and entry points into and out of the enclosure. The zipper portions 111 are each approximately 80" long and cooperates with the like zipper portions 137 on the side panels to form the entries and exits into and out of the enclosure.

The side panels 130 include a 64" vertical extent screen 133 having a 22½" vertical extent horizontal piece 131 of fabric with the 7" pocket 136 extending the full length thereof. A 4" in diameter polyvinyl chloride tube 125 with stopper 126 is inserted into the pocket 136 and is filled as previously disclosed. The web 134 is about 2" wide and has the snaps 135 positioned therein at approximately 12" intervals. The female fasteners 135 correspond to and align with the male fasteners 138 on the vehicle body. The upper pocket 131 of the side panel 130 is about 2" in vertical extent while the upwardly extending steel portion 132 is about 1" in vertical extent.

The poles 90 are each comprised of three 2½ ft. sections, each about 1" in diameter into which at the base is inserted a machined tip 92 which is accepted by the plate 95 mounted on the roller 66. The opposite end of the pole 90 is provided with a resilient tip 91 that is spring-loaded which fits against the awning rail 60 about 2" inside the adjacent awning edge. The tension provided by the spring-loaded poles 90 maintain each of the side panels 130 taut and supports them in place. A horizontal cross hole (not shown) is drilled in each pole 90 near the end 92 thereof to permit the front cable 120 to be installed, and particularly the shank portions 116 of the eye bolts 115 to pass therethrough. A construction similar to the strip 107 and D-ring 122 is provided on the side panels 130 but has not been illustrated, and this construction in combination with the previously described poles 90 maintain the side panels 130 taut and in tension.

The rear panel 150 is made entirely of fabric having a 30" vertical extent with a 2" overlap at the top and a 7" pocket at the base running the full horizontal length of the enclosure. The rear panel 150 attaches to the vehicle 50 at a position approximately below the base molding of the vehicle. The 2" hem at the top has the same type of fasteners 135 as previously disclosed with respect to the side panel 130 with corresponding male fasteners 138 on the vehicle itself. The pocket 156 at the bottom of the panel 150 receives a 3" diameter polyvinyl chloride waterproof tube (not shown) extending the the full horizontal length of the rear panel. Additional sections of fabric are furnished to cover the wheel cover areas.

After the awning 65 has been extended and the side panels 130 and front panel 100 mounted as previously described, the water bags 125 are inserted into the appropriate pockets and filled in situ. The weight of the water maintains the various panels securely in contact with the ground or cement pad without the need of stakes, tie-downs or the like and insures that the enclosure is insect free and sealed completely around the periphery thereof.

As used herein, "trailer" or "travel trailer" includes any recreational vehicle such as but not limited to a travel trailer, motor home, mini motor home, or any classified recreational vehicle as accepted by the Recreational Vehicle Industry Assoc. (R.V.I.A.).

While there has been described what at present is considered to be the preferred embodiment of the present invention, it should be appreciated that various modifications and alterations may be made therein without departing from the true spirit and scope of the present invention, and it is intended to cover in the appended claims all such variations and modifications.

What is claimed is:

1. An outside room for a travel trailer comprising frame means constructed and arranged to be connected to one side of the travel trailer and to extend outwardly, therefrom, said frame means having two members extending substantially perpendicularly to the longitudinal axis of the trailer interconnected by a member parallel to the longitudinal axis of the trailer, a roof covering said members and connected to the trailer, a front panel mounted on said parallel member having sufficient length to extend from said member to the ground, means for maintaining said parallel member and said front panel in tension including a cable and threaded members bearing against said perpendicular members for maintaining said cable under tension, two side panels each respectively mounted on one of said perpendicular members and each having sufficient length to extend from said respective member to the ground, means connecting one edge of each side panel to the trailer and the edge parallel thereto the the adjacent edge of said panel, and watertight containers connected to said side panels and said front panel near the bottoms thereof.

2. The invention set forth in claim 1, and further comprising a rear panel connected at the top thereof to the trailer and a watertight container connected to the rear panel near the bottom thereof.

3. The invention set forth in claim 1, wherein each front and side panel has a top fabric portion thereof formed into a pocket for connecting to the associated member and a bottom fabric portion formed into a pocket for receiving therein the associated watertight container.

4. The invention set forth in claim 1, wherein the longitudinal extent of said watertight containers are less than the longitudinal extents of the associated panels to permit entry and exit at the junctures of said panels.

5. The invention set forth in claim 1, wherein said panels each have fabric pockets at the bottoms thereof which receive therein said watertight containers, said pockets each being provided with an opening along the top thereof to accommodate a plug in the associated watertight container to facilitate filling said container in situ with water.

6. The invention set forth in claim 5, wherein said watertight container is a synthetic organic resin having an opening therein with an integral plug therefor connected to said container by a one piece hinge.

7. The invention set forth in claim 1, wherein said perpendicular members are spring-loaded braces abutting the trailer at one end and mounted to an awning roller at the other end, said side panels being mounted on said spring-loaded braces and said front panel being mounted on said cable extending between said braces.

8. The invention set forth in claim 7, wherein each side panel has an upstanding flange at the top thereof extending between the associated brace and the awning.

* * * * *